United States Patent [19]
Ahlgren
[11] Patent Number: 4,676,767
[45] Date of Patent: Jun. 30, 1987

[54] DRIVING DEVICE FOR SIGNS

[76] Inventor: Stig B. Ahlgren, Korpralgatan 7, S-212 33 Malmoe, Sweden

[21] Appl. No.: 855,759

[22] Filed: Apr. 24, 1986

[30] Foreign Application Priority Data

Apr. 29, 1985 [SE] Sweden ................................ 8502055

[51] Int. Cl.[4] ................................................ F16H 7/02
[52] U.S. Cl. ........................................ 474/84; 474/903
[58] Field of Search .................................... 474/84–89, 474/68, 903, 170, 152; 40/524

[56] References Cited

U.S. PATENT DOCUMENTS

| | | | |
|---|---|---|---|
| 2,412,114 | 12/1946 | Zonis | 474/88 |
| 2,933,934 | 4/1960 | Haroldson | 474/903 X |
| 3,299,551 | 1/1967 | Llobet | 40/524 X |
| 3,525,271 | 8/1970 | Raines | 474/903 X |
| 3,696,685 | 10/1972 | Lampredi | 474/903 X |

FOREIGN PATENT DOCUMENTS

| | | | |
|---|---|---|---|
| 0156142 | 10/1985 | European Pat. Off. | 40/524 |

*Primary Examiner*—Stephen J. Novosad
*Assistant Examiner*—Thuy M. Bui
*Attorney, Agent, or Firm*—Tarolli, Sundheim & Covell

[57] ABSTRACT

The present invention relates to a driving device for signs having movable display screens which are multilateral and simultaneously rotatable by means of a driving unit for providing a number of continuously recurrent pictures corresponding to the number of sides on the display screens. Some of the display screens comprise two toothed pulleys of which one is adapted to cooperate with a toothed belt for transferring the driving power of the driving unit from a preceding display screen. The other pulley is adapted to cooperate with another toothed belt for transferring the driving power to a succeeding display screen. In order to facilitate setting of the display screens relative to each other by tightening and loosening of said toothed pulleys and by preventing toothed pulleys for the same display screen from rotating relative to each other during setting, both toothed pulleys for the display screen form part of a toothed twin-pulley as toothed portions which are fixedly connected to each other. The toothed twin-pulley further comprises a clamping device with clamping members positioned axially outside the toothed portions. At least one clamping means is provided on the clamping members and extends transversely to the axis of rotation of the toothed twin-pulley for tightening to clamp the clamping device on a shaft journal on the display screen.

10 Claims, 7 Drawing Figures

DRIVING DEVICE FOR SIGNS

BACKGROUND OF THE INVENTION

The present invention relates to a driving device for signs having movable display screens which are multilateral and simultaneously rotatable by means of a driving unit for providing together a number of continuously recurrent pictures corresponding to the number of sides on the display screens. Specifically at least some of the display screens include two toothed pulleys of which one is adapted to cooperate with a toothed belt for transferring the driving power of the driving unit from a preceding display screen and the other is adapted to cooperate with another toothed belt for transferring the driving power to a succeeding display screen.

With signs of the abovementioned type it is important to be able to quickly set the display screens in exact relations to each other. Hitherto, it has not been possible to perform such setting operations quickly and without causing any problem, because present toothed pulleys have been difficult to get at for clamping and loosening. It has also been difficult to attain exact setting of the toothed pulleys relative to each other, because it has been necessary to loosen several pulleys at the same time and thereafter hold them in an exact mutual relationship until they are once again clamped. Since it is often necessary to perform the setting operations high up on scaffolds and in bad weather, these problems have further increased.

The object of the present invention has been to eliminate the above problems and provide a device which substantially facilitates the procedure of setting the display screens in exact positions relative to each other.

The present invention permits easy access to the clamping device of the toothed pulleys from the front of the sign by means of a simple tool for clamping and loosening said pulleys and it is possible to loosen and clamp both pulleys in each display screen simultaneously without the risk of displacement of said screens relative to each other.

BRIEF DESCRIPTION OF THE DRAWINGS

The invention will be further described below with reference to the accompanying drawings, in which.

DESCRIPTION OF A PREFERRED EMBODIMENT

Figure 1:
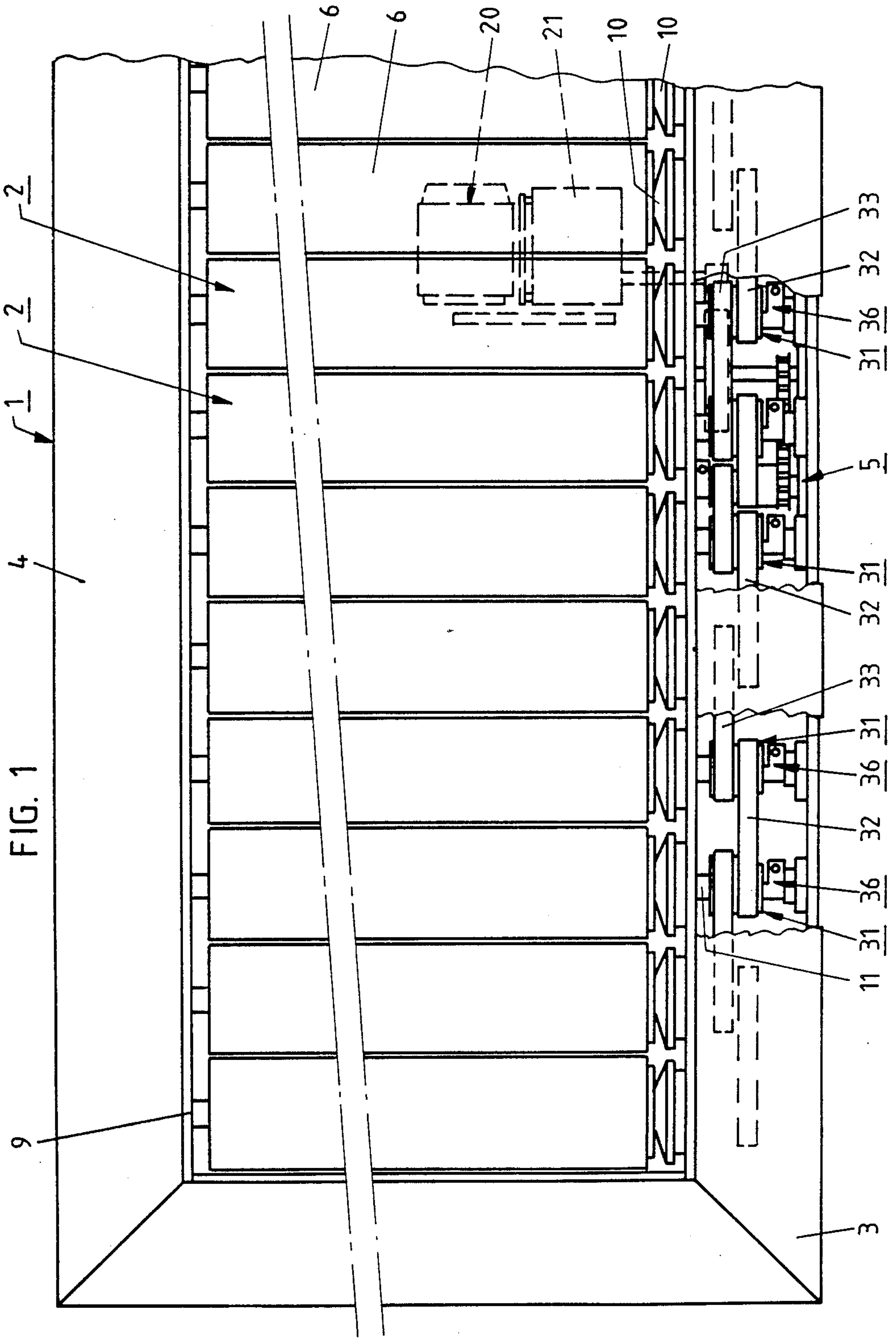
FIG. 1 illustrates the front of a portion of a sign having a driving device according to the invention.

The sign illustrated in the drawings comprises a bay frame 1 and a plurality of trilateral display screens 2 standing beside each other in the bay frame and rotatably journalled in lower and upper parts 3 and 4 thereof. The display screens 2 are rotated simultaneously by means of a driving device 5 positioning them such that all display screens simultaneously turn a first side 6 forwardly and the first sides of all display screens thereby together provide a first picture. The driving device 5 may thereafter rotate all display screens 2 simultaneously until all display screens turn a second screen side 7 forwardly such that these sides of all display screens provide a second picture. The driving device 5 may then rotate all display screens 2 simultaneously until all display screens turn a third screen side 8 forwardly such that these sides of all display screens provide a third picture. The driving device 5 may continue its rotation until the first picture is shown once again and thus, have the display screens 2 to show continuously recurrent pictures corresponding to the number of screen sides 6, 7 and 8 of the display screens.

Each display screen 2 is supported by a holder 9 provided on the upper part 4 of the bay frame 1 and permitting rotation of the display screen 2 relative to the upper part. At the bottom, each display screen 2 stands on a dog 10 which is non-rotatably arranged on a shaft journal 11 which is rotatably journalled in the lower part 3 of the bay frame 1. Specifically, the shaft journal 11 is journalled in a lower and on an upper shank 12 and 13 of a U-shaped member of said lower part through a lower and an upper bearing 14 and 15 respectively. Each bearing 14, 15 comprises a tightened bearing housing 16 and 17 respectively, with movably arranged and spherically shaped ball bearings 18 and 19 respectively. The shaft journal 11 is inserted into the ball bearings, and since said ball bearings are movable and spherical, they can adapt themselves to the shaft journal such that the shaft journal is not jammed in the bearings 14, 15.

For rotating the shaft journals 11, the driving device 5 comprises a driving unit 20, e.g. an electric motor, provided on the bay frame 1 and driving a belt transmission 22, 23 and 24 via a gearbox 21. The belt transmission drives, via a chain 25, a sprocket 26 on a rotatably journalled shaft journal 27. The shaft journal 27 has a toothed twin-pulley 28 of the type described below.

The toothed twin-pulley 28 on the shaft journal 27 operates, through an upper toothed belt 29, a series of display screens 2 and, through a lower toothed belt 30, another series of display screens 2. On each shaft journal 11 there is provided a toothed twin pulley 31 of the same type as the toothed pulley 28. The upper toothed belt 29 drives such a toothed pulley 31 on a shaft journal 11 and its display screen 2 and the rotational movement is transferred through a lower toothed belt 32 to a toothed pulley 31 on the shaft journal 11 of the succeeding display screen. The rotational movement of which is in turn, through an upper toothed belt 33, transferred to a toothed twin-pulley 31 on a shaft journal 11 on the succeeding display screen 2 for rotation thereof, and so on.

The lower toothed belt 30 drives a toothed twin-pulley 31 and its shaft journal 11 for the display screen 2 and the rotational movement is further transferred to the toothed twin-pulley 31 and the shaft journal 11 to be succeeding display screen 2 through an upper toothed belt 33 and so on.

In order to substantially facilitate the setting of the positions of the display screens 2 relative to each other during setting, operating as few movable members as possible and permitting access to the required members from the front of the sign by means of simple tools, each toothed twin-pulley 31 is designed and mounted in a special manner. Thus, the toothed pulleys 31 are double in the sense that previously two separately mounted toothed pulleys on each shaft journal 11 form part of the toothed twin-pulley 31 as toothed portions 34, 35 which are non-rotatably connected to each other. Thereby a toothed pulley on the shaft journal 11, during setting of the display screens 2 relative to each other, is prevented from being displaced in relation to another toothed pulley on the same shaft journal. In order to substantially facilitate access from the front of the sign for clamping or loosening this toothed twin-pulley 31, said pulley comprises a clamping device 36 with clamping members 37, 38 positioned axially outside the toothed portions 34, 35 and at least one clamping means 39 on said clamping members 37, 38, e.g. a bolt 40 inserted through a bore in the clamping members and a nut 41 threaded on said bolt. The clamping means 39 extends transversely to the axis of rotation R of the toothed twin-pulley 31 and contracts the clamping device 36 such that said device is attached to the shaft journal 11 with a firm grip.

The clamping members of the clamping device 36 more specifically comprise flanges 37 and 38 extending radially outwards from a sleeve 42 and adapted to clasp the shaft journal 11 along with the sleeve. The sleeve 42 extends through a cylindrical member 43 defining both toothed portions 34, 35 and it is connected to the cylindrical member at four arms extending substantially axially relative to said cylindrical member. Tub arms 44, 45 are situated close to each other and they are extended from the cylindrical member 43 to provide the clamping members 37, 38 of the clamping device 36. These two arms 44, 45 and the two other arms 46, 47 are displaced about 60° relative to each other. For facilitating the contraction of the clamping device 36, the clamping members 37, 38 are separated from the arms 44, 45 through a groove 48 running substantially in alignment with the outer side of the cylindrical member 43. In order to obtain a firm grip on the shaft journal for the toothed twin-pulley 31 the sleeve 42 and arms 44-47 extend along the entire length of the cylindrical member 43.

Figure 2:
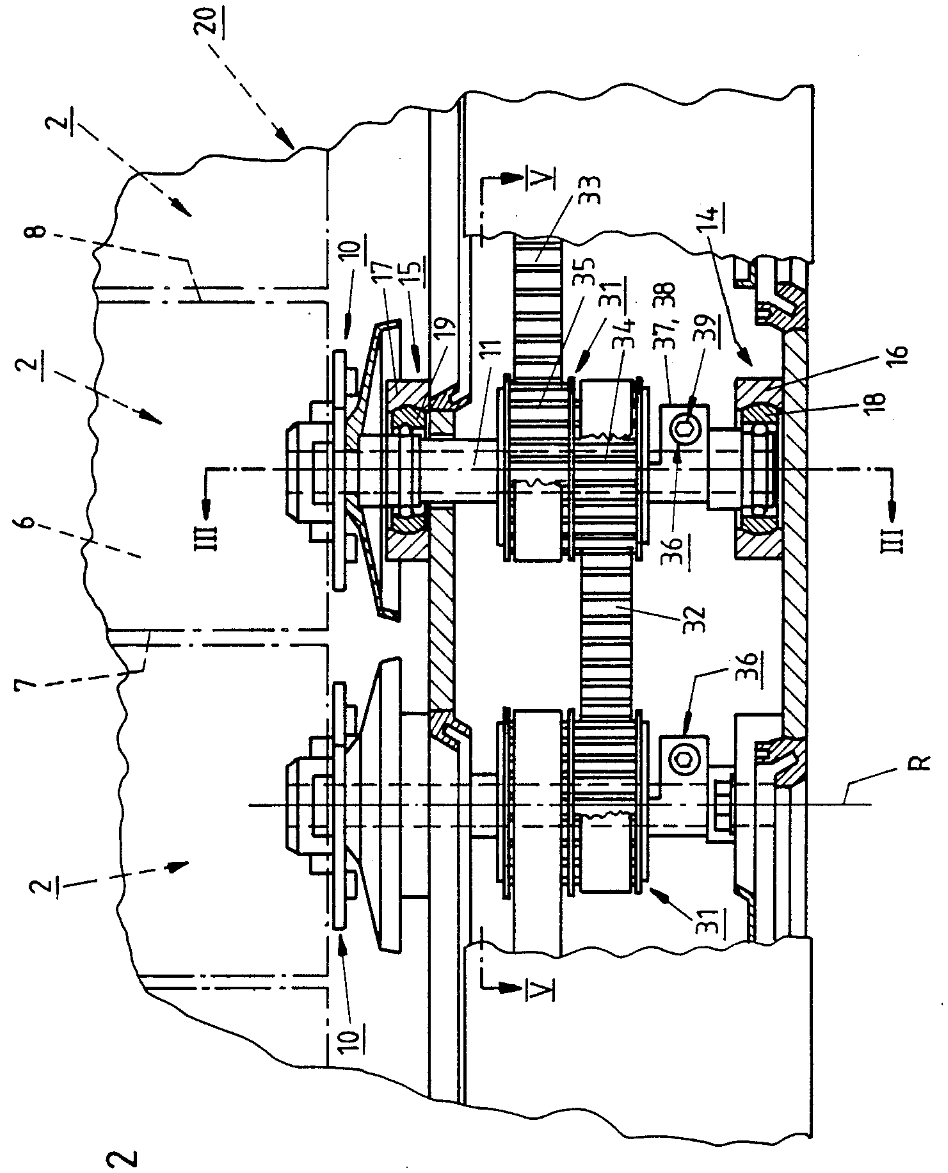
FIG. 2 illustrates a part of FIG. 1 in enlarged scale.
Figure 3:
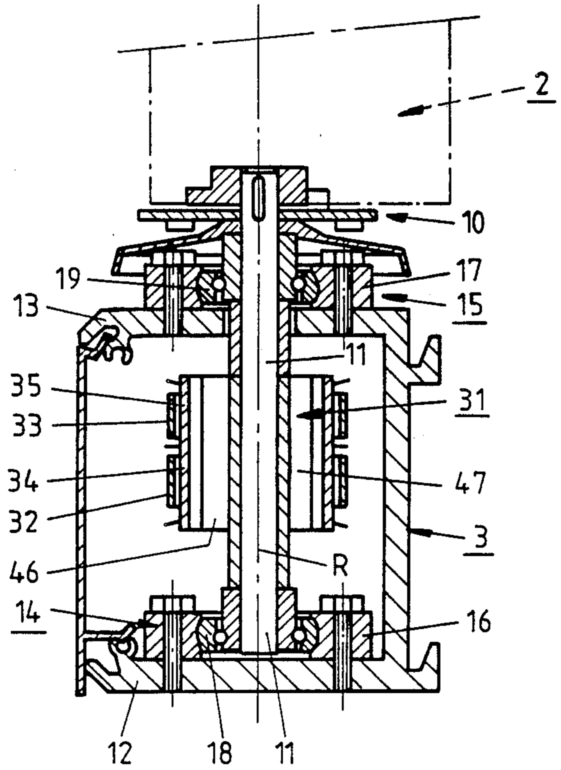
FIG. 3 is a section through parts in the sign along the line III—III in FIG. 2.
Figure 4:
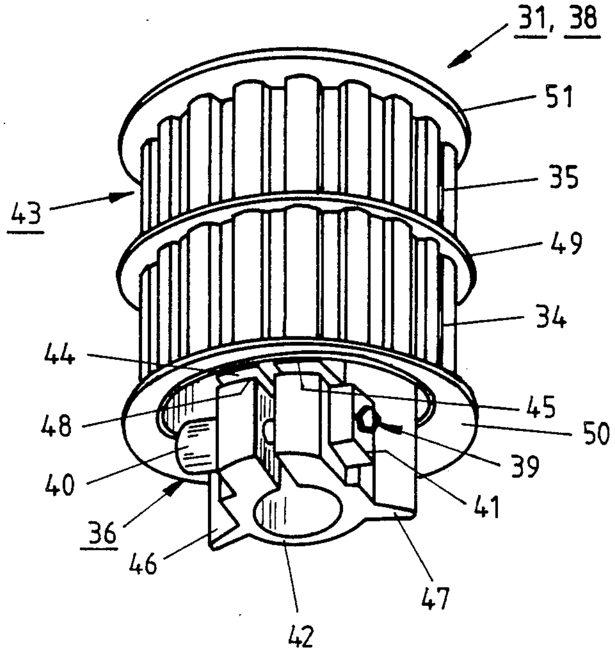
FIG. 4 is a perspective view of a toothed pulley forming part of the sign.
Figure 5:
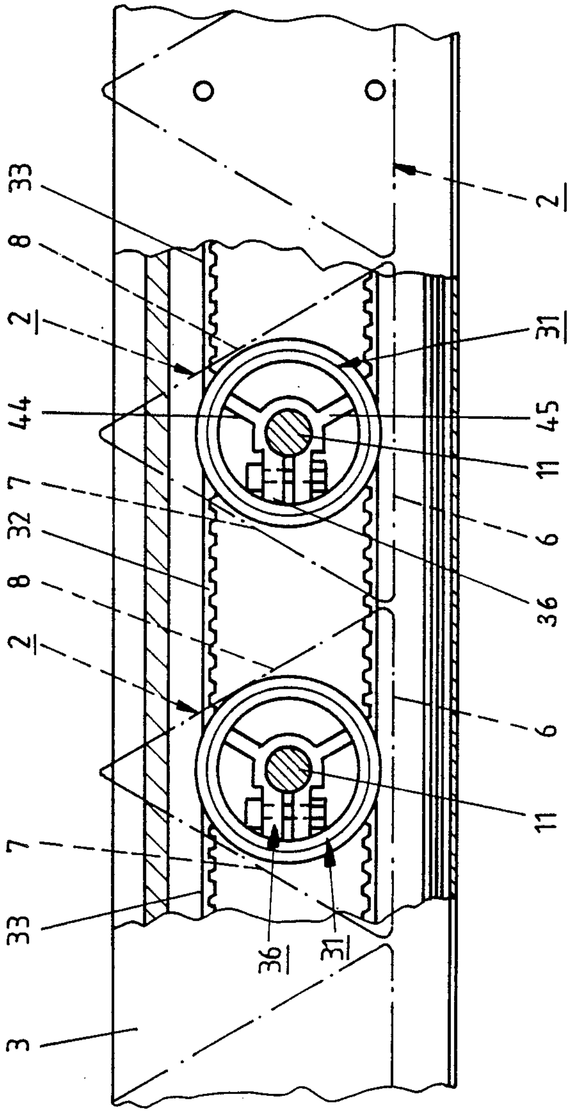
FIG. 5 is a section through parts in the signs along the line V—V in FIG. 2.
Figure 6:
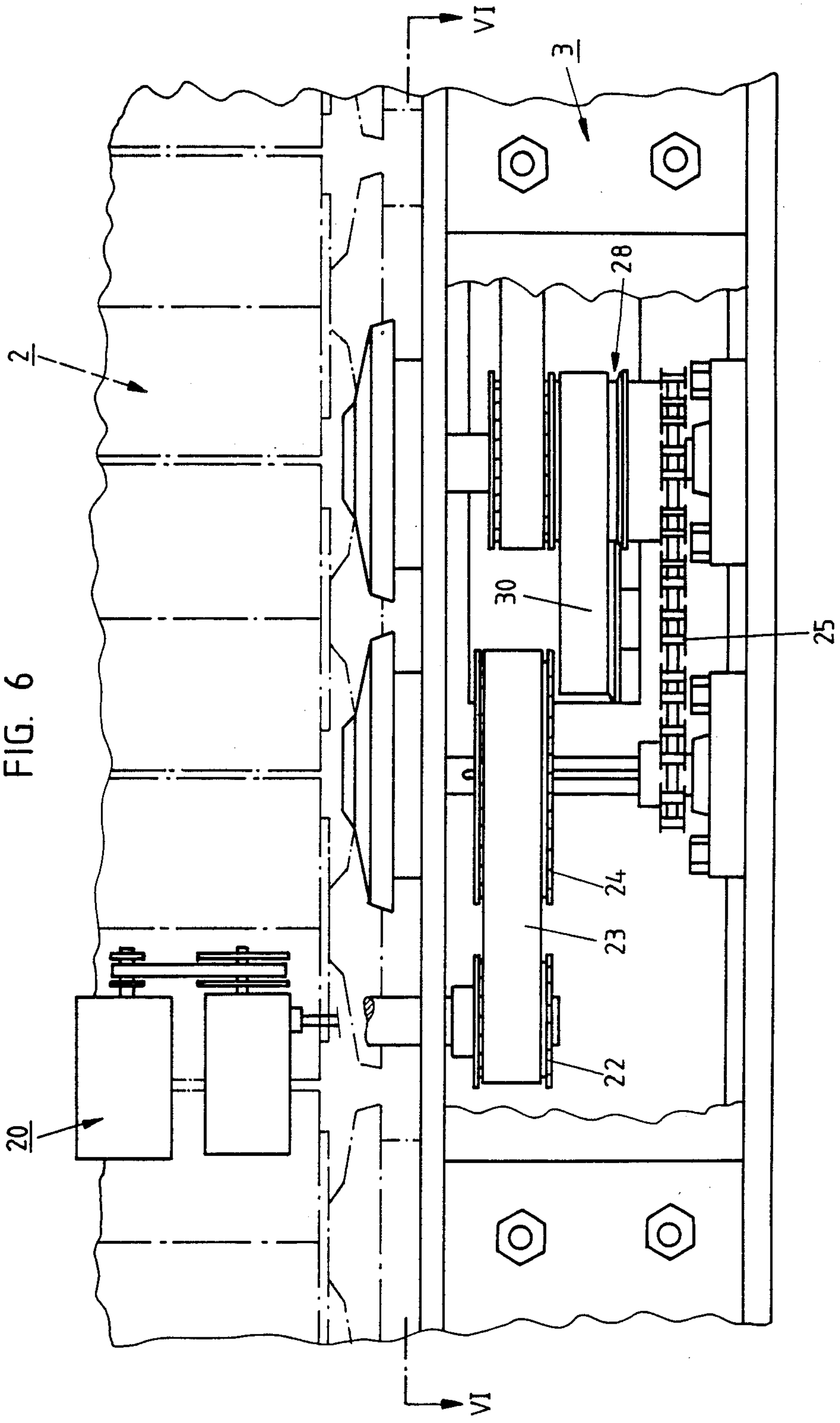
FIG. 6 illustrates another part of FIG. 1 in enlarged scale.
Figure 7:
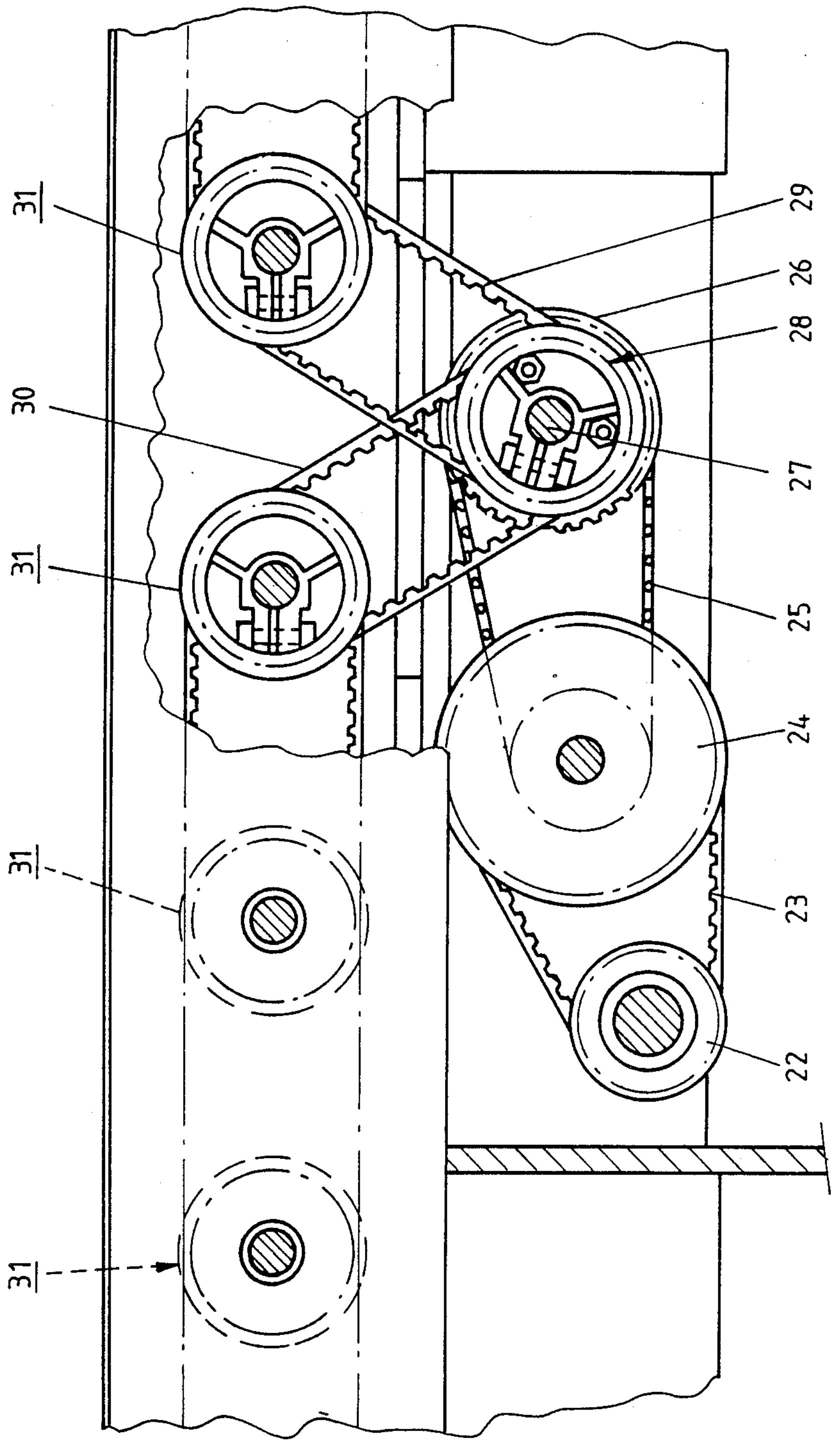
FIG. 7 illustrates parts in the sign along the line VI—VI in FIG. 6.

Since, the embodiment shown, it is easiest to get at the clamping means 39 from the front with the required tools from beneath the toothed twin-pulleys 31, these twin-pulleys are disposed on the shaft journals 11 such that the clamping devices 36 are facing downwards (see FIG. 1 or 2).

The cylindrical member 43 is divided into its two toothed portions 34, 35 by a partition ring 49 and each toothed portion is limited outwardly by an edge ring 50, 51. Hereby it is guaranteed that the toothed belt 32, 33 remain in their positions on the toothed twin-pulleys 31.

The main object of the invention described above is that the two toothed pulleys for each display screen are rigidly connected to each other such that they cannot be displaced relative to each other during setting and such that they can be quickly clamped or loosened from the shaft journal. The main object is further that the clamping device is visible from the front and easily accessible from the front for firm tightening thereof and easy loosening even if it is strongly tightened. These objects are realized by means of the device described above and illustrated in the drawings, but alternative embodiments are of course possible. An alternative embodiment is e.g. that the toothed twin-pulley are made up of two single pulleys which are screwed together or connected to each other in any other way. Finally, it should be noted that the driving device is applicable to other types of display screens than trilateral.

Having described a preferred embodiment, I claim:

1. A driving device for signs having multi-sided display screens supported on shafts for simultaneous rotation to provide a number of recurring pictures corresponding to the number of sides on the display screens, each of the shafts being rotatably supported in a frame, said driving device comprising:
   - a plurality of toothed pulleys, each of said pulleys releasably connectible with one respective shaft for setting the position of said pulley relative to said shaft;
   - a plurality of toothed drive belts, each of said drive belts meshingly engaging two toothed pulleys on adjacent shafts to drivingly interconnect the two adjacent shafts;
   - said plurality of pulleys including at least one toothed twin-pulley, said twin pulley including:
   - a first toothed portion;
   - a second toothed portion fixedly connected with said first toothed portion in a coaxial relationship; and
   - a clamping portion fixedly connected with said second toothed portion and disposed axially away from said second toothed portion for applying a clamping force transversely to the shaft for fixing said twin pulley on the shaft in any one of a plurality of angular positions.

2. A driving device for signs having multi-sided display screens supported on shafts for simultaneous rotation to provide a number of recurring pictures corresponding to the number of sides on the display screens, each of the shafts being rotatably supported in a frame, said driving device comprising:
   - a plurality of toothed pulleys, each of said pulleys being releasably connected with a resepective shaft for setting the position of said pulley relative to said respective shaft;
   - a plurality of toothed drive belts, each of said drive belts meshingly engaging two toothed pulleys on adjacent shafts to drivingly interconnect the two adjacent shafts;
   - said plurality of toothed pulleys including at least one toothed twin-pulley, said twin pulley including:
   - a first toothed portion;
   - a second toothed portion fixedly connected with said first toothed portion in a coaxial relationship;
   - a clamping portion fixedly connected with said second toothed portion and spaced axially from said second toothed portion for applying a clamping force transversely to the shaft, said clamping portion comprising a sleeve to be disposed around a portion of the shaft and two clamping members which extend radially outward from said sleeve; and
   - means for pressing said clamping members toward one another for reducing the diameter of said sleeve to exert said clamping force on the shaft.

3. A driving device for signs having multi-sided display screens supported on shafts for simultaneous rotation to provide a number of recurring pictures corresponding to the number of sides on the display screens, each of the shafts being rotatably supported in a frame, said driving device comprising:
   - a plurality of toothed pulleys, each of said pulleys being releasably connected with a respective shaft for setting the position of said pulley relative to said respective shaft;

a plurality of toothed drive belts, each of said drive belts meshingly engaging two toothed pulleys on adjacent shafts to drivingly interconnect the two adjacent shafts;

said plurality of toothed pulleys including at least one toothed twin-pulley, said twin pulley including:

a first toothed portion;

a second toothed portion fixedly connected with said first toothed portion in a coaxial relationship; and a clamping portion fixedly connected with said second toothed portion and spaced axially from said second toothed portion for applying a clamping force transversely to the shaft;

said shaft having a portion on which said toothed twin-pulley is disposed and which is supported for rotation by ball bearings disposed axially beyond opposite ends of said toothed twin-pulley.

4. A driving device for signs having multi-sided display screens supported on shafts for simulaneous rotation to provide a number of recurring pictures corresponding to the number of sides on the display screens, each of the shafts being rotatably supported in a frame, said driving device comprising:

a plurality of toothed pulleys, each of said pulleys being releasably connected with a respective shaft for setting the position of said pulley relative to said respective shaft;

a plurality of toothed drive belts, each of said drive belts meshingly engaging two toothed pulleys on adjacent shafts to drivingly interconnect the two adjacent shafts;

said plurality of toothed pulleys including at least one toothed twin-pulley, said twin pulley including:

a first toothed portion;

a second toothed portion fixedly connected with said first toothed portion in a coaxial relationship; and a clamping portion fixedly connected with said second toothed portion and disposed axially away from said second toothed portion for applying a clamping force transversely to the shaft;

a motor; and a transmission adapted to be drivingly connected with a first series of the display screens and with a second series of the display screns by a first toothed twin-pulley.

5. A driving device as set forth in claim 2 wherein said pulley defines a cylindrical inner surface, said sleeve extending coaxially at least partially inside said cylindrical inner surface and having a plurality of radially extending arms connecting said sleeve with said cylindrical inner surface, two of said plurality of radially extending arms disposed adjacent to one another comprising said clamping members, and each of said clamping members including a surface defining an arcuate groove extending partially into said radially extending arms.

6. A driving device as set forth in claim 5 wherein said sleeve and said plurality of radially extending arms extend axially for the length of said cylindrical inner surface.

7. A driving device as set forth in claim 6 wherein said clamping members are disposed axially outside of said cylindrical inner surface and said toothed twin-pulley is disposed on the shaft whereby said clamping members are lower than said toothed portions inner surface.

8. A driving device as set forth in claim 2 wherein said toothed twin-pulley further includes a partition ring extending circumferentially around said toothed twin-pulley to divide said toothed twin-pulley into two toothed portions, and a pair of edge rings each extending circumferentially around axially opposite end portions of said toothed twin-pulley.

9. A driving device as set forth in claim 2 wherein each shaft has a respective toothed twin-pulley in clamping engagement therewith for transmitting a driving force from a preceeding shaft to a subsequent shaft.

10. A driving device as set forth in claim 4 wherein a chain drivingly connects said transmission with said first toothed twin-pulley.

* * * * *